US008676590B1

(12) United States Patent
Sorensen et al.

(10) Patent No.: US 8,676,590 B1
(45) Date of Patent: Mar. 18, 2014

(54) WEB-BASED AUDIO TRANSCRIPTION TOOL

(71) Applicant: Google Inc., Mountain View, CA (US)

(72) Inventors: Jeffrey Scott Sorensen, New York, NY (US); Masayuki Nanzawa, Danville, CA (US); Ravindran Rajakumar, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/627,027

(22) Filed: Sep. 26, 2012

(51) Int. Cl.
*G10L 21/06* (2013.01)

(52) U.S. Cl.
USPC ........... 704/276; 704/270; 704/278; 715/723; 715/731

(58) Field of Classification Search
None
See application file for complete search history.

(56) References Cited

U.S. PATENT DOCUMENTS

| | | | |
|---|---|---|---|
| 5,799,273 A * | 8/1998 | Mitchell et al. ............... | 704/235 |
| 7,706,520 B1 * | 4/2010 | Waterson et al. ........ | 379/265.06 |
| 7,761,296 B1 | 7/2010 | Bakis et al. | |
| 7,805,673 B2 | 9/2010 | der Quaeler et al. | |
| 7,836,412 B1 * | 11/2010 | Zimmerman ................. | 715/827 |
| 7,979,281 B2 | 7/2011 | Kahn et al. | |
| 7,996,229 B2 * | 8/2011 | Da Palma et al. .......... | 704/270.1 |
| 8,009,966 B2 | 8/2011 | Bloom et al. | |
| 8,249,870 B2 * | 8/2012 | Roy et al. ...................... | 704/244 |
| 2003/0040917 A1 | 2/2003 | Fiedler | |
| 2004/0006481 A1 * | 1/2004 | Kiecza et al. ................. | 704/276 |
| 2004/0138894 A1 | 7/2004 | Kiecza et al. | |
| 2005/0010409 A1 * | 1/2005 | Hull et al. ..................... | 704/243 |
| 2006/0149558 A1 * | 7/2006 | Kahn et al. .................... | 704/278 |
| 2006/0190249 A1 * | 8/2006 | Kahn et al. .................... | 704/235 |
| 2007/0203704 A1 * | 8/2007 | Ozkaragoz et al. ........... | 704/260 |
| 2007/0203706 A1 * | 8/2007 | Ozkaragoz et al. ........... | 704/260 |
| 2008/0319742 A1 * | 12/2008 | Da Palma et al. ............. | 704/235 |
| 2008/0319744 A1 * | 12/2008 | Goldberg ....................... | 704/235 |
| 2009/0037171 A1 * | 2/2009 | McFarland et al. ........... | 704/235 |
| 2009/0052636 A1 * | 2/2009 | Webb et al. ................. | 379/88.14 |

(Continued)

OTHER PUBLICATIONS

Marge et al. "Using the Amazon Mechanical Turk for Transcription of Spoken Language" 2010.*

(Continued)

*Primary Examiner* — Greg Borsetti
(74) *Attorney, Agent, or Firm* — Remarck Law Group PLC

(57) ABSTRACT

A computer-implemented technique for transcribing audio data includes generating, along a vertical axis on a display of a client device, an image representing audio content. The technique further includes receiving, from a user of the client device, a selection of a portion of the image; and generating, via an audio module of the client device, an audio output corresponding to the selected portion of the image. The technique further includes receiving, from the user, a selection indicating a position along the vertical axis on the display to enter a text portion representing the audio output, wherein the position is aligned to the selected portion of the image. The technique further includes receiving, from the user, the text portion representing the audio output; and displaying, on the display, the text portion at the position, wherein the text portion extends along a horizontal axis on the display.

18 Claims, 5 Drawing Sheets

(56) References Cited

U.S. PATENT DOCUMENTS

| | | | |
|---|---|---|---|
| 2009/0240652 A1* | 9/2009 | Su et al. | 707/1 |
| 2010/0036662 A1* | 2/2010 | Emmons | 704/235 |
| 2010/0121637 A1* | 5/2010 | Roy et al. | 704/235 |
| 2010/0286982 A1* | 11/2010 | Ramaswamy et al. | 704/235 |
| 2011/0119059 A1* | 5/2011 | Ljolje et al. | 704/244 |
| 2011/0173537 A1* | 7/2011 | Hemphill | 715/716 |
| 2011/0239107 A1* | 9/2011 | Phillips et al. | 715/234 |
| 2011/0269429 A1* | 11/2011 | Othmer | 455/412.1 |
| 2011/0313933 A1* | 12/2011 | Dai et al. | 705/301 |
| 2012/0027186 A1* | 2/2012 | Walker et al. | 379/93.02 |
| 2013/0035936 A1* | 2/2013 | Garland et al. | 704/235 |

OTHER PUBLICATIONS

Williams et al. "Crowd-sourcing for difficult transcription of speech" Dec. 15, 2011.*

Liem et al. "An Iterative Dual Pathway Structure for Speech-to-Text Transcription" Aug. 8, 2011.*

* cited by examiner

WEB-BASED AUDIO TRANSCRIPTION TOOL

FIELD

This disclosure relates to techniques for transcribing audio content and facilitating concurrent transcription and editing of the audio content by multiple parties.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Transcribing audio data into text can be useful in many applications. For example, in a simplest application, a dictation including recorded audio data can be transcribed into text by listening to the audio data and by transcribing the audio data into text. In more complex applications, such as speech-recognition applications, language models can be built by transcribing a variety of speech-related audio data. Using the language models, a speaker's speech can be recognized and transcribed into text.

SUMMARY

A client device configured to transcribe audio content includes a communication module, a display module, a user interface, an audio module, and an input module. The communication module receives audio content from a server. The display module generates an image representing the audio content along a vertical axis on a display of the client device. The user interface allows a user to select a portion of the image. The audio module generates an audio output corresponding to the selected portion of the image. The input module receives from the user (i) a selection indicating a position along the vertical axis on the display to enter a text portion representing the audio output, wherein the position is aligned to the selected portion of the image, and (ii) the text portion representing the audio output. The display module displays the text portion at the position on the display. The text portion extends along a horizontal axis on the display. The communication module transmits a post to the server in response to the user selecting the position and entering the text portion at the position. The post includes an identifier indicating the position of the text portion relative to the selected portion of the image represented by the text portion.

A computer-implemented technique includes generating, along a vertical axis on a display of a client device, an image representing audio content. The technique further includes receiving, from a user of the client device, a selection of a portion of the image; and generating, via an audio module of the client device, an audio output corresponding to the selected portion of the image. The technique further includes receiving, from the user, a selection indicating a position along the vertical axis on the display to enter a text portion representing the audio output, where the position is aligned to the selected portion of the image. The technique further includes receiving, from the user, the text portion representing the audio output; and displaying, on the display, the text portion at the position, where the text portion extends along a horizontal axis on the display.

A client device configured to transcribe audio content includes a display module, a user interface, an audio module, and an input module. The display module generates an image representing audio content along a vertical axis on a display of the client device. The user interface allows a user to select a portion of the image. The audio module generates an audio output corresponding to the selected portion of the image. The input module receives from the user (i) a selection indicating a position along the vertical axis on the display to enter a text portion representing the audio output, wherein the position is aligned to the selected portion of the image, and (ii) the text portion representing the audio output. The display module displays the text portion at the position on the display. The text portion extends along a horizontal axis on the display.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
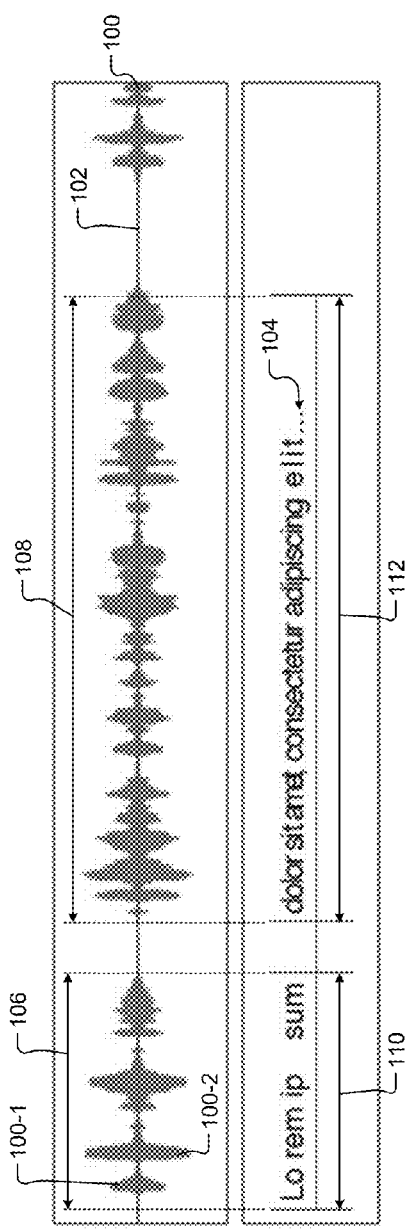
FIG. 1 depicts an image of audio content displayed as a waveform along a horizontal axis and corresponding transcription of the audio content entered along the horizontal axis.

The present disclosure relates to techniques for transcribing audio content and facilitating concurrent transcription and editing of the audio content by multiple parties. One technique for transcribing audio content is shown in FIG. 1. The technique includes displaying the audio content displayed as a waveform 100 along a horizontal axis 102, listening to an audio output generated based on the audio content, and entering text 104 representing portions of the waveform below the portions along the horizontal axis. For example, the waveform 100 may include a first portion 106, a second portion 108, which may respectively correspond to a first portion 110, a second portion 112 of the text 104. Each portion of the waveform 100 may include lobes or bumps 100-1, 100-2, and so on, that represent features of the audio content that may correspond to a portion of the text 104.

When transcribing, a transcriber displays the waveform 100 representing the audio content on a display as shown and listens to the audio content represented by the waveform 100.

The transcriber enters text corresponding to a portion of the waveform 100 below the portion of the waveform 100. For example, the transcriber enters the first portion 110 of the text 104 below the first portion 106 of the waveform 100; the transcriber enters the second portion 112 of the text 104 below the second portion 108 of the waveform 100; and so on.

The transcriber aligns text representing a portion of the waveform 100 to the portion of the waveform 100. For example, the transcriber aligns the text "Lo rem ip sum" to the first portion 106 of the waveform 100 as shown; the transcriber aligns the text "dolor sit amet, . . . " to the second portion 108 of the waveform 100 as shown; and so on. Further, in aligning the text "Lo rem ip sum" to the first portion 106 of the waveform 100, the transcriber aligns the text "Lo" to the bump 100-1 as shown; the transcriber aligns the text "rem" to the bump 100-2 as shown; and so on.

This technique has many drawbacks. For example, the technique provides limited space to enter text. Specifically, when a large amount of text represents a small portion of the waveform, the text entered may not align with the portion of the waveform. Rather, the text may encompass an additional portion of the waveform not represented by the text. To align a large amount of text that represents a small portion of the waveform, the text may have to be compacted to such an extent that the compacted text may be unreadable.

Figure 2:
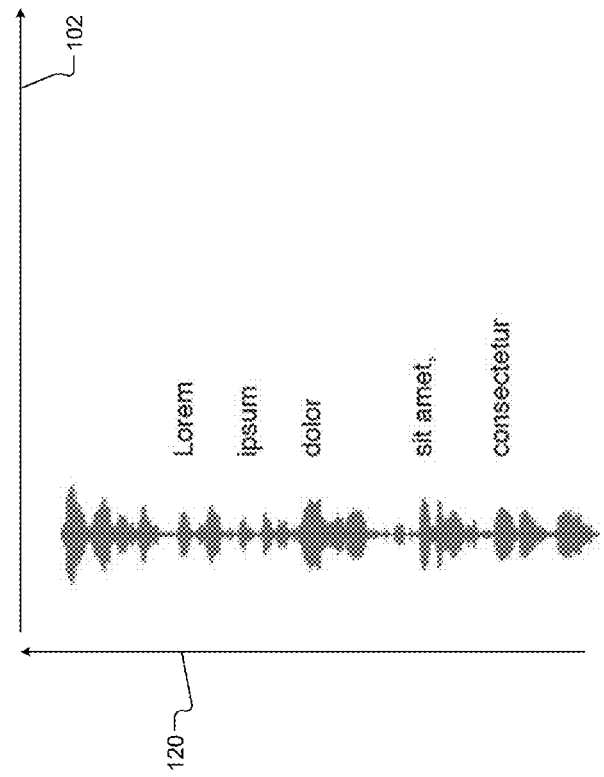
FIG. 2 depicts an image of audio content displayed as a waveform along a vertical axis and corresponding transcription of the audio content entered along a horizontal axis.

Instead, if the waveform 100 is displayed along a vertical axis 120 and the text is entered along the horizontal axis 102 as shown in FIG. 2, the transcriber gets sufficient space along the horizontal axis 102 to enter text next to a portion of the waveform 100. Accordingly, when a large amount of text represents a small portion of the waveform, the text entered aligns with the portion of the waveform. Additionally, the transcriber can zoom into the waveform 100 at different zoom levels and transcribe the audio content at different resolutions as shown in FIGS. 3A and 3B.

Figure 3B:
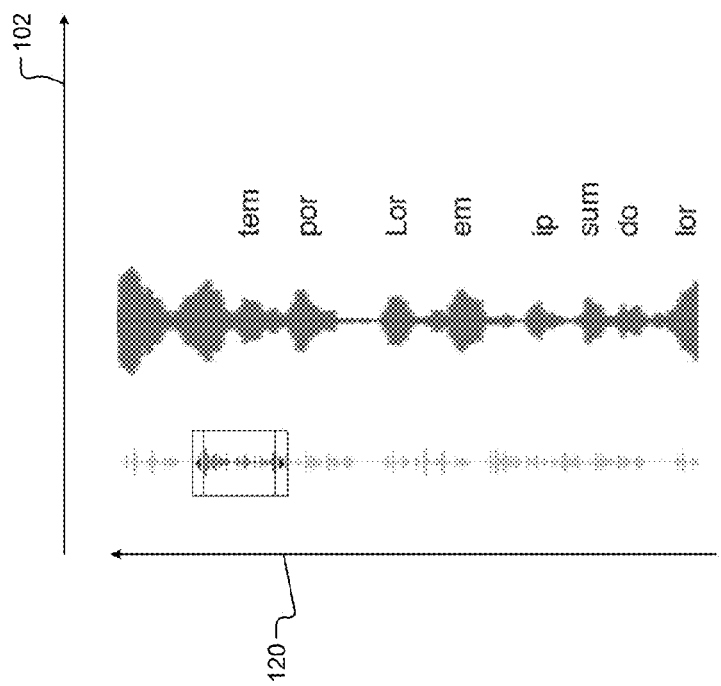
FIGS. 3A and 3B depict an image of audio content displayed as a waveform along a vertical axis, where portions of the image are zoomed in on at different levels, and corresponding transcription is entered along a horizontal axis.
Figure 3A:
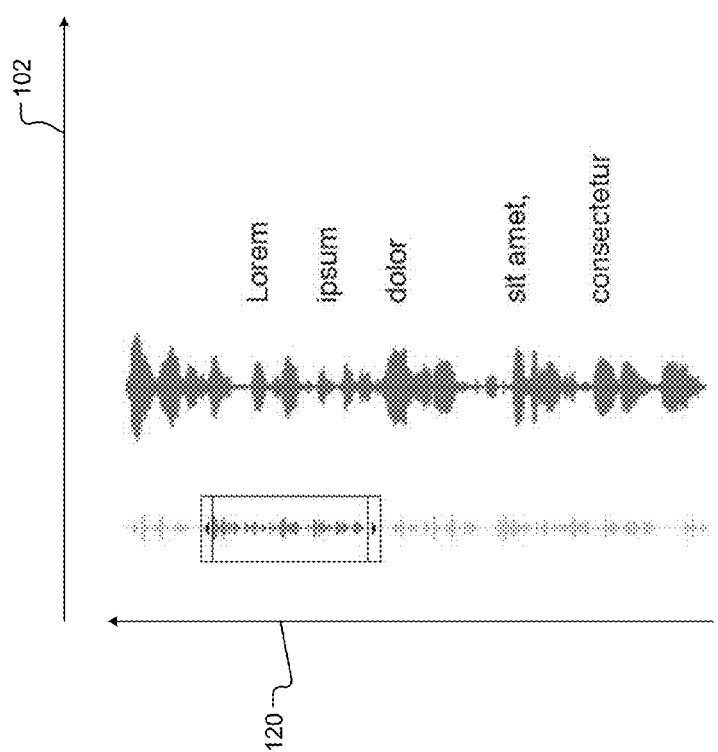

For example, the transcriber can zoom into the waveform 100 at a first zoom level as shown in FIG. 3A and at a second zoom level as shown in FIG. 3B. The second zoom level shows a portion of the waveform 100 in greater detail than the first zoom level. Accordingly, the portion of the waveform 100 zoomed in on at the second zoom level can be transcribed at a greater resolution than when the waveform is zoomed in on at the first zoom level. For example, when zoomed in on at the first zoom level, a portion of the waveform 100 corresponds to the text "Lorem" as shown in FIG. 3A. When zoomed in on at the second level, the portion of the waveform 100 corresponding to the text "Lorem" can be transcribed into two sets of text "Lor" and "em" as shown in FIG. 3B. Other advantages of this technique are described below.

In general, the technique includes running a transcription tool on a client device and requesting audio content from a server. On receiving the audio content, the transcription tool displays the audio content as a waveform along the vertical axis on a display of the client device. The transcription tool displays a graphical user interface (GUI) having controls to navigate through the waveform. For example, the controls include clickable buttons such as play, pause, rewind, and so on. Using the controls, the transcriber selects and plays a portion of the waveform and enters text adjacent to the portion of the waveform along the horizontal axis. The text is entered at a position that is vertically aligned to the played portion of the waveform. The portion can be replayed if the text entered is misaligned, and the text can be vertically repositioned relative to the replayed portion to ensure alignment.

A post is sent to the server each time the transcriber selects a position to enter text and enters a character of the text at the selected position. Each post includes an identifier that specifies the position of the text relative to the portion of the waveform represented by the text. Accordingly, multiple parties can concurrently transcribe and edit the same or different portions of the waveform.

Further, as explained with reference to FIGS. 3A and 3B, the transcriber can zoom in on the waveform and expand a portion of the waveform into multiple sub-portions. The transcriber can then enter text adjacent to, and in alignment with, the sub-portions. For example, a portion of the waveform representing the text "transparent" can include two sub-portions respectively representing the words "trans" and "parent." The transcriber can align the words "trans" and "parent" with the respective sub-portions of the waveform.

Posts, each with a distinct identifier, are generated for each text entered. The posts generated for the sub-portions correspond to the post that would be generated for a portion from which the sub-portions are obtained. For example, posts for the words "trans" and "parent" would correspond to a post generated for the word "transparent." The server correlates the posts generated for sub-portions to the post generated for the portion from which the sub-portions are obtained. Accordingly, the audio content can be transcribed at different resolutions.

Figure 4:
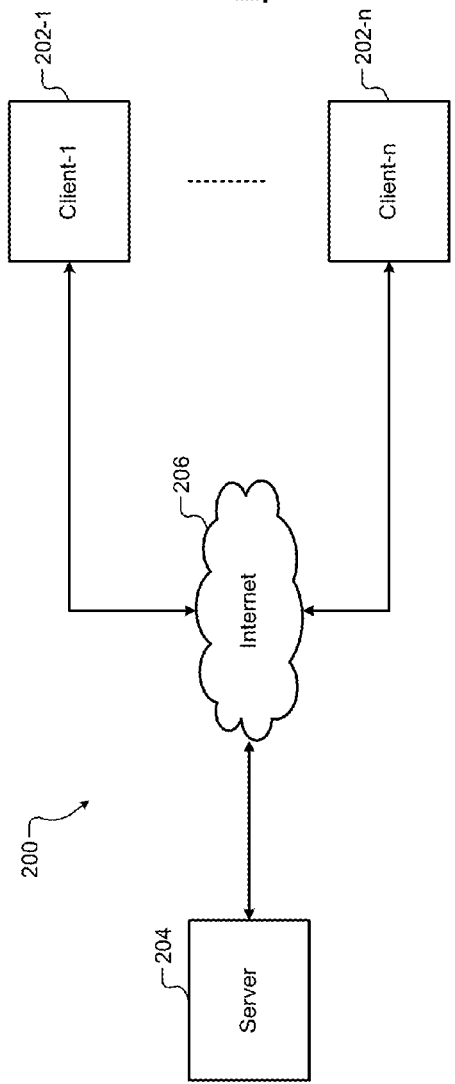
FIG. 4 depicts a technique for transcribing audio content that includes a plurality of client devices in communication with a server via the Internet.

Referring now to FIG. 4, a technique 200 for transcribing audio content according to the present disclosure is shown. The technique 200 may include a plurality of clients 202 (e.g., client-1 202-1, . . . , and client-n 202-n) that can communicate with a server 204 via the Internet 206. While only one server 204 is shown, the technique 200 may include a plurality of servers, and each client 202 may communicate with more than one server 204. The client 202 may include a personal computer (e.g., a laptop), a tablet, a Smartphone, and so on. The client 202 executes a Web-based transcription application that receives audio content from the server 204 via the Internet 206 and that allows a user to transcribe the audio content as explained below. Throughout the present disclosure, the word "Web" means the World-Wide Web.

Figure 5:
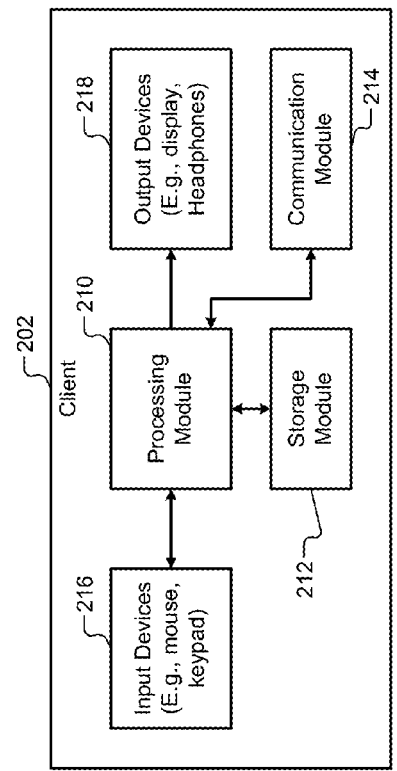
FIG. 5 is a functional block diagram of a client device configured to transcribe audio content according to the present disclosure.

Referring now to FIG. 5, the client 202 includes a processing module 210, a storage module 212, a communication module 214, a plurality of input devices 216, and a plurality of output devices 218. The plurality of input devices 216 may include a mouse, a keypad, a touch-screen, and so on. The plurality of output devices 218 may include a display (with or without touch-screen), headphones, speakers, and so on. The storage module 212 may be optional. The client 202 communicates with the server 204 via the Internet 206 using the communication module 214.

The processing module 210 runs the Web-based transcription application. The application opens a Web browser on the display of the client 202. A user can access the server 204 using the Web browser and request audio content from the server 204. The client 202 receives the audio content via the Internet 206 and the communication module 214. The client 202 may store the audio content in the storage module 212. The processing module 210 generates an image of the audio content and vertically displays the image on the display of the client 202 as shown in FIG. 2.

The application also generates a GUI on the display of the client 202. The GUI provides clickable buttons such as play, pause, rewind, and so on. By clicking on the buttons, the user can navigate through the image. Using the GUI, the user can select a portion of the image. The processing module 210 generates an audio output corresponding to the selected portion of the image. The user can listen to the audio output via headphones, for example. The user selects a position along a horizontal axis on the display next to a portion of the image to enter text that corresponds to the audio output of the portion of the image. For example, the user may select the position by clicking the mouse at the position. Using the keypad, the user may then enter the text corresponding to the audio output at the selected position.

Figure 6:
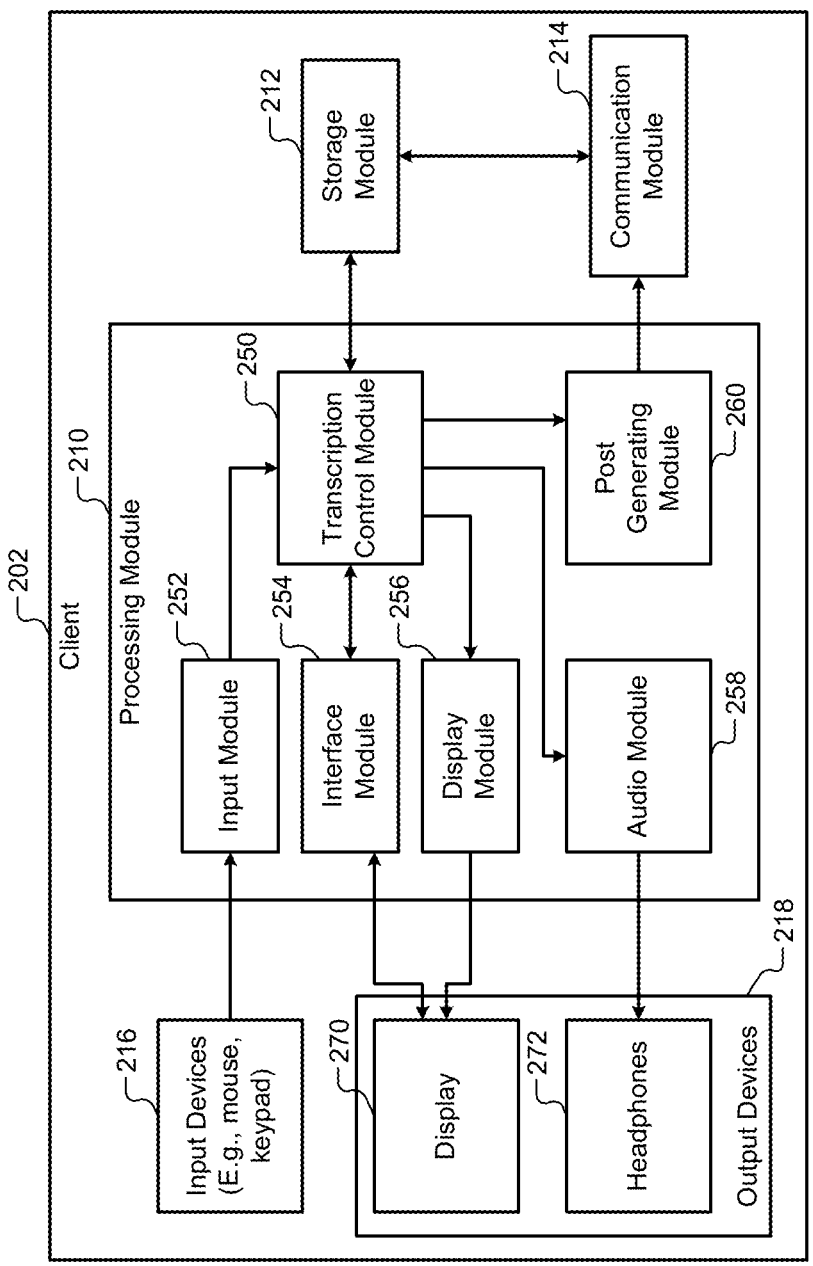
FIG. 6 depicts a detailed configuration of the client device of FIG. 5.

Using the GUI, the user may pause the audio output to finish typing the text. The user may rewind the audio output and fill-in the text that could not be typed and/or correct the text that was mistyped earlier. The user may rewind the audio output and reposition the text to realign the text to the portion of the image represented by the text. The user may zoom in on the image. The audio output of the zoomed in on portion of the image is played at a slower rate than normal. Pitch of the slow playback of speech may be corrected to render the slow playback intelligible. Accordingly, the user can transcribe the zoomed in on portion of the image at a greater resolution than normal. These and other features of the transcription process are described below in detail Referring now to FIG. 6, the client 202 is shown in detail. The processing module 210 includes a transcription control module 250, an input module 252, an interface module 254, a display module 256, an audio module 258, and a post generating module 260. The output devices 218 include a display 270 and headphones 272, for example. The display 270 may include a touch-screen, which may also function as an input device.

The transcription control module 250 executes the Web-based transcription application and controls operations of the input module 252, the interface module 254, the display module 256, the audio module 258, and the post generating module 260. The input module 252 receives an input from the user via one of the input devices (e.g., a keypad) that includes a request to receive audio content from the server 204. The communication module 214 transmits the request to the server 204 and receives the audio content from the server 204 via the Internet 206. The transcription control module 250 generates an image of the audio content. The transcription control module 250 may store the audio content in the storage module 212.

The display module 256 displays the image representing the audio content along the vertical axis on the display 270 of the client 202. The interface module 254 generates the GUI on the display 270 that allows the user to select a portion of the image for transcription. The interface module 254 also interfaces with a touch-screen when available and receives inputs entered by the user via the touch-screen. For example, using the touch-screen, the user can enter one or more inputs that would be otherwise entered using the input devices 216. The user can also select one or more functions provided by the GUI using the touch-screen.

The audio module 258 generates an audio output corresponding to the selected portion of the image. The user enters a selection via the input module 252 (e.g., using a mouse) indicating a position along the vertical axis on the display 270 to enter a text portion representing the audio output. The position is aligned to the selected portion of the image. The user enters the text portion representing the audio output via the input module 252 (e.g., using the keypad). The display module 256 displays the text portion at the selected position on the display 270. The text portion extends along the horizontal axis on the display 270 as shown in FIG. 2.

The post generating module 260 generates a post in response to the user selecting the position and entering the text portion at the selected position. The post includes an identifier indicating the position of the text portion relative to the selected portion of the image represented by the text portion. The communication module 214 transmits the post to the server 204.

Using the GUI, the user may enter a request to regenerate (i.e., replay) the audio output corresponding to the selected portion of the image. The input module 252 may receive an input from the user to regenerate (i.e., replay) the audio output corresponding to the selected portion of the image. The audio module 258 may regenerate the audio output corresponding to the selected portion of the image. The user may enter a new selection indicating a new position along the vertical axis on the display 270 to enter the text portion representing the replayed audio output. The input module 252 may receive the new selection from the user. The new position is aligned to the selected portion of the image. The user may enter the text portion representing the replayed audio output. The input module 252 may receive the text portion representing the replayed audio output from the user. The display module 256 may display the text portion at the new position. The text portion extends along the horizontal axis.

The post generating module 260 generates a new post in response to the user selecting the new position and entering the text portion at the new position. The post includes an identifier indicating the new position of the text portion relative to the selected portion of the image represented by the text portion. The communication module 214 transmits the new post to the server 204.

The user may use the GUI to zoom in on the selected portion of the image. The input module 252 may receive an input from the user to zoom in on the selected portion of the image and to generate an enlarged image on the display 270. For example, the enlarged image may include a first portion and a second portion. For example, see portions of the image corresponding to the words "Lor" and "em" shown in FIG. 3B. The audio module 258 generates audio outputs corresponding to the first portion and the second portion of the enlarged image.

The user may enter a first selection indicating a first position along the vertical axis on the display 270 to enter a first text portion representing the audio output corresponding to the first portion of the enlarged image. For example, the user may click on the position where the word "Lor" should be typed. The input module 252 may receive the first selection from the user. The first position is aligned to the first portion of the enlarged image. The user may then enter the first text portion (e.g., the word "Lor"). The display module 256 displays the first text portion at the first position. The first text portion extends along the horizontal axis and is aligned to the first portion of the enlarged image.

The post generating module 260 generates a first post in response to the user selecting the first position and entering the first text portion at the first position. The first post includes an identifier indicating the first position of the first text portion relative to the first portion of the enlarged image represented by the first text portion. The communication module 214 transmits the first post to the server 204.

Subsequently, the user may enter a second selection indicating a second position along the vertical axis on the display 270 to enter a second text portion representing the audio output corresponding to the second portion of the enlarged image. For example, the user may click on the position where the word "em" should be typed. The input module 252 may receive the second selection from the user. The second position is aligned to the second portion of the enlarged image. The user may then enter the second text portion (e.g., the word "em"). The display module 256 displays the second text portion at the second position. The second text portion extends along the horizontal axis and is aligned to the second portion of the enlarged image.

The post generating module 260 generates a second post in response to the user selecting the second position and entering the second text portion at the second position. The second post includes an identifier indicating the second position of the second text portion relative to the second portion of the enlarged image represented by the second text portion. The communication module 214 transmits the second post to a server.

The position aligned to the selected portion of the image without using zoom (e.g., the position corresponding to the word "Lorem") corresponds (i.e., correlates) to the first position aligned to the first portion of the enlarged image (e.g., the position corresponding to the word "Lor") and the second position aligned to the second portion of the enlarged image (e.g., the position corresponding to the word "em"). Additionally, the post generated in response to the user selecting the position and entering the text portion at the position (e.g., for the word "Lorem") corresponds (i.e., correlates) to the first post generated in response to the user selecting the first position and entering the first text portion (e.g., for the word "Lor") and the second post generated in response to the user selecting the second position and entering the second text portion (e.g., for the word "em").

Other users may concurrently transcribe the same or different portions of the audio content. Further, one user may concurrently edit transcription of another user. Additionally, other users may concurrently view transcription in progress. For example, a second client (e.g., client 202-2) may include a display module that generates the same image of the audio content that is being transcribed on another client (e.g., client 202-1). The image represents the audio content along the vertical axis on the display of the second client. A GUI on the display of the second client allows a user of the second client to select a portion of the image. The portion may be the same as, or different than, that selected by the user of the other client.

An audio module of the second client generates an audio output corresponding to the portion of the image. An input module of the second client receives a selection from the user of the second client. The selection indicates a position along the vertical axis on the display of the second client to enter a text portion representing the audio output. The position is aligned to the portion of the image. The input module of the second client then receives the second text portion from the user of the second client. The display module of the second client displays the text portion at the position on the display of the second client. The text portion extends along the horizontal axis on the display of the second client.

A post generating module of the second client generates a post in response to the user of the second client selecting the position and entering the text portion at the selected position on the display of the second client. The post includes an identifier indicating the position of the text portion relative to the portion of the image represented by the text portion on the display of the second client. A communication module of the second client transmits the post to the server 204.

The server 204 synchronizes the posts received from different clients 202 based on the identifiers included in the posts. Accordingly, a first client may transcribe the audio content without enlarging while a second client may transcribe the same audio content with enlarging. Thus, each client may transcribe different portions of the audio content with and without enlarging. Further, the first client may transcribe the audio content while the second client may edit the transcription of the audio content entered by the first client. For example, the second client may correct spelling errors or alignment of text entered by the first client. There are many ways to display the transcriptions from different clients for the same portion of audio. When the clients disagree, the disagreements can be highlighted, and color or on-screen markers can be used to mark the portions of conflict in the audio. The server 204 correlates the posts received from the first client and the second client to provide a single transcription of the audio content.

Figure 7:
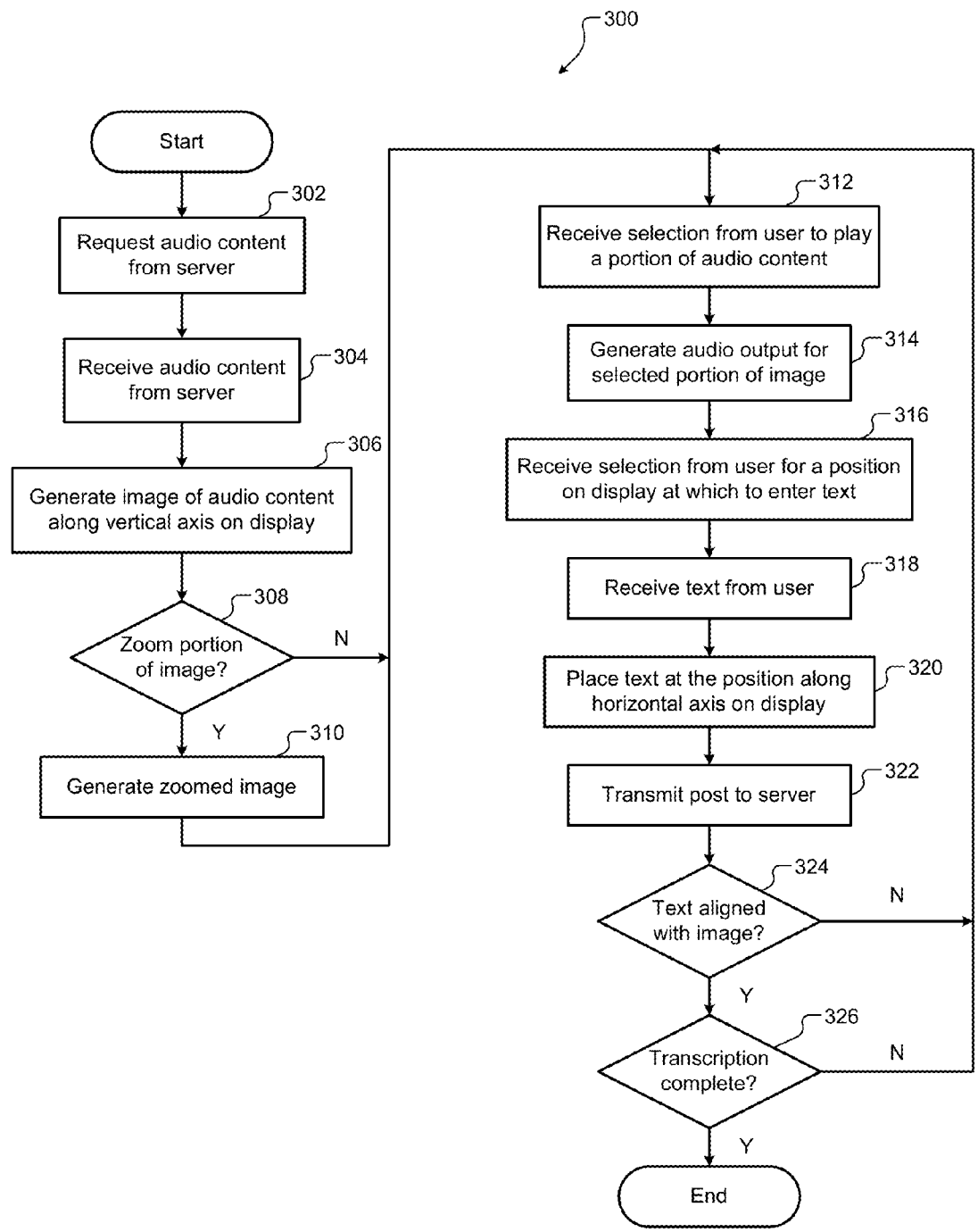
FIG. 7 is a flowchart of a technique for transcribing audio content according to the present disclosure.

Referring now to FIG. 7, a technique 300 for transcribing audio content according to the present disclosure is shown. At 302, control sends a request to a server to receive audio content from the server. At 304, control receives audio content from the server. At 306, control generates an image representing the audio content along a vertical axis on a display of a client device. At 308, control determines if a portion of the image is to be zoomed in on. At 310, control magnifies the portion of the image if the portion of the image is to be enlarged.

At 312, irrespective of the result at 308, control receives a selection of a portion of the image (or the enlarged image) from the user. At 314, control generates an audio output for the selected portion of the image. At 316, control receives a selection from the user indicating a position along the vertical axis on the display to enter a text portion representing the audio output. The position is aligned to the selected portion of the image. At 318, control receives from the user the text portion representing the audio output. At 320, control places (i.e., displays) the text portion at the position on the display. The text portion extends along a horizontal axis on the display.

At 322, control transmits a post to the server in response to the user selecting the position and entering the text portion at the position. The post includes an identifier indicating the position of the text portion relative to the selected portion of the image represented by the text portion. At 324, the user determines whether the text portion is aligned with the selected portion of the image. If the text portion is not aligned with the selected portion of the image, the user replays the selected portion of the image by returning to 312. At 326, if the text portion is aligned with the selected portion of the image, control determines if transcription is complete. Control returns to 312 if transcription is incomplete. Control ends if transcription is complete.

The replay portion of the technique 300 is now described in further detail. Control regenerates the audio output for the portion of the image selected to be replayed. Control receives a selection from the user indicating a new position along the vertical axis on the display to enter the text portion representing the audio output. The new position is aligned to the selected portion of the image. Control receives from the user the text portion representing the audio output and displays the text portion at the new position. The text portion extends along the horizontal axis. Control transmits a new post to the server in response to the user selecting the new position and entering the text portion at the new position. The new post includes an identifier indicating the new position of the text portion relative to the selected portion of the image.

The zooming portion of the technique 300 is now described in further detail. For example, the enlarged image may include a first portion and a second portion. Control generates audio outputs corresponding to the first portion and the second portion of the enlarged image. Control receives a first selection from the user indicating a first position along the vertical axis on the display to enter a first text portion representing the audio output corresponding to the first portion of the enlarged image. The first position is aligned to the first portion of the enlarged image. Control receives the first text portion from the user and displays the first text portion at the first position. The first text portion extends along the horizontal axis. Control transmits a first post to the server in response to the user selecting the first position and entering the first text portion at the first position. The first post includes an identifier indicating the first position of the first text portion relative to the first portion of the enlarged image.

Next, control receives a second selection from the user indicating a second position along the vertical axis on the display to enter a second text portion representing the audio output corresponding to the second portion of the enlarged image. The second position is aligned to the second portion of the enlarged image. Control receives from the user the second text portion and displays the second text portion at the second position. The second text portion extends along the horizontal axis. Control transmits a second post to the server in response to the user selecting the second position and entering the second text portion at the second position. The second post includes an identifier indicating the second position of the second text portion relative to the second portion of the enlarged image.

The first and second positions respectively aligned to the first and second portions of the enlarged image correspond to a position that the user may select while transcribing an un-magnified portion of the image that includes the first and second portions. Additionally, the first and second posts respectively transmitted while transcribing the first and second portions of the enlarged image correspond to a post that would be transmitted if the user transcribed the un-magnified portion that includes the first and second portions.

In other words, the server correlates the first and second posts respectively received for the first and second portions of the enlarged image to a post received for the un-magnified portion of the image that includes the first and second portions. Additionally, when more than one transcriber transcribes different portions of the same audio content, the server correlates the posts received from different transcribers to generate a single consistent transcription of the audio content. There are many ways to display the transcriptions from different clients for the same portion of audio. When the clients disagree, the disagreements can be highlighted, and color or on-screen markers can be used to mark the portions of conflict in the audio. The server also correlates the posts when an editor edits a transcriber's transcription and generates a single transcription of the audio content.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
generating, at a server having one or more processors, an image representing audio content;
providing, from the server, the image and the audio content to a plurality of client devices, the image being provided for display along a vertical axis on a display of each of the client devices;
receiving, at the server, a first post from a first client device of the plurality of client devices, the first post including a first identifier indicating (i) a first position along the vertical axis of the image, and (ii) a first text portion representative of at least a portion of the audio content at the first position, the first text portion being entered by a first user of the first client device;
receiving, at the server, a second post from a second client device of the plurality of client devices, the second post including a second identifier indicating (i) a second position along the vertical axis of the image, and (ii) a second text portion representative of at least a portion of the audio content at the second position, the second text portion being entered by a second user of the second client device;
synchronizing, at the server, the first and second posts based on the first and second identifiers;
correlating, at the server, the first and second posts to provide a single transcription of the audio content,
receiving, at the server, a command to zoom in on a portion of the image from the first client device;
generating, at the server, a second image in response to receiving the command, the second image representing an enlargement of the portion of the image;
providing, from the server, the second image to the first client device for display along the vertical axis on the display of the first client device;
receiving, at the server, a third post from the first client device, the third post including a third identifier indicating (i) a third position along the vertical axis of the second image, and (ii) a third text portion representative of at least a portion of the audio content at the third position, the third text portion being entered by the first user of the first client device; and
synchronizing, at the server, the first, second and third posts based on the first, second and third identifiers,
wherein correlating the first and second posts to provide the single transcription of the audio content includes correlating the first, second and third posts to provide the single transcription.

2. The method of claim 1, wherein the third position in the second image corresponds to at least one of the first position and the second position in the first image.

3. The method of claim 1, wherein correlating the first, second and third posts provides the single transcription at different resolutions.

4. The method of claim 1, wherein the server comprises a plurality of servers.

5. The method of claim 1, wherein the portion of the audio content at the third position comprises a sub-portion of the audio content at least one of the portions of the audio content at the first and second positions.

6. The method of claim 1, wherein the first post is received from the first client device subsequent to the first user selecting the first position and entering the first text portion at the first client device.

7. A computer-implemented method, comprising:
generating, at a server having one or more processors, a first image representing audio content;
providing, from the server, the first image and the audio content to a plurality of client devices, the first image being provided for display along a vertical axis on a display of each of the client devices;

receiving, at the server, a first post from a first client device of the plurality of client devices, the first post including a first identifier indicating (i) a first position along the vertical axis of the first image, and (ii) a first text portion representative of at least a portion of the audio content at the first position, the first text portion being entered by a first user of the first client device;

receiving, at the server, a command to zoom in on a portion of the first image from a second client device of the plurality of client devices;

generating, at the server, a second image in response to receiving the command, the second image representing an enlargement of the portion of the first image;

providing, from the server, the second image to a second client device for display along the vertical axis on the display of the second client device;

receiving, at the server, a second post from the second client device, the second post including a second identifier indicating (i) a second position along the vertical axis of the second image, and (ii) a second text portion representative of at least a portion of the audio content at the second position, the second text portion being entered by a second user of the second client device;

synchronizing, at the server, the first and second posts based on the first and second identifiers; and correlating, at the server, the first and second posts to provide a single transcription of the audio content.

8. The method of claim 7, wherein correlating the first and second posts provides the single transcription at different resolutions.

9. The method of claim 7, wherein the server comprises a plurality of servers.

10. The method of claim 7, wherein the second position in the second image corresponds to the first position in the first image.

11. The method of claim 7, wherein the first post is received from the first client device subsequent to the first user selecting the first position and entering the first text portion at the first client device.

12. The method of claim 7, wherein the portion of the audio content at the second position comprises a sub-portion of the audio content at the portion of the audio content at the first position.

13. A non-transitory computer-readable storage medium storing computer executable code that, when executed by a computing device having one or more processors, cause the computing device to perform operations comprising:

generating an image representing audio content;

providing the image and the audio content to a plurality of client devices, the image being provided for display along a vertical axis on a display of each of the client devices;

receiving a first post from a first client device of the plurality of client devices, the first post including a first identifier indicating (i) a first position along the vertical axis of the image, and (ii) a first text portion representative of at least a portion of the audio content at the first position, the first text portion being entered by a first user of the first client device;

receiving a second post from a second client device of the plurality of client devices, the second post including a second identifier indicating (i) a second position along the vertical axis of the image, and (ii) a second text portion representative of at least a portion of the audio content at the second position, the second text portion being entered by a second user of the second client device;

synchronizing the first and second posts based on the first and second identifiers;

correlating the first and second posts to provide a single transcription of the audio content;

receiving a command to zoom in on a portion of the image from the first client device;

generating a second image in response to receiving the command, the second image representing an enlargement of the portion of the image;

providing the second image to the first client device for display along the vertical axis on the display of the first client device;

receiving a third post from the first client device, the third post including a third identifier indicating (i) a third position along the vertical axis of the second image, and (ii) a third text portion representative of at least a portion of the audio content at the third position, the third text portion being entered by the first user of the first client device; and synchronizing the first, second and third posts based on the first, second and third identifiers, wherein correlating the first and second posts to provide the single transcription of the audio content includes correlating the first, second and third posts to provide the single transcription.

14. The computer-readable storage medium of claim 13, wherein the third position in the second image corresponds to at least one of the first position and the second position in the first image.

15. The computer-readable storage medium of claim 13, wherein correlating the first, second and third posts provides the single transcription at different resolutions.

16. The computer-readable storage medium of claim 13, wherein the server comprises a plurality of servers.

17. The computer-readable storage medium of claim 13, wherein the portion of the audio content at the third position comprises a sub-portion of the audio content at least one of the portions of the audio content at the first and second positions.

18. The computer-readable storage medium of claim 13, wherein the first post is received from the first client device subsequent to the first user selecting the first position and entering the first text portion at the first client device.

* * * * *